United States Patent [19]

Kamimura et al.

[11] Patent Number: 5,033,770
[45] Date of Patent: Jul. 23, 1991

[54] CONTROLLING APPARATUS FOR ACTIVE SUSPENSION SYSTEM FOR AUTOMOTIVE VEHICLE

[75] Inventors: Katsuyoshi Kamimura; Atsushi Mine; Yutaka Hiwatashi, all of Tokyo, Japan

[73] Assignee: Fuji Jukogyo Kabushiki Kaisha, Tokyo, Japan

[21] Appl. No.: 410,834

[22] Filed: Sep. 22, 1989

[30] Foreign Application Priority Data

Sep. 30, 1988 [JP] Japan ................ 63-246242

[51] Int. Cl.⁵ .................................. B60G 17/00
[52] U.S. Cl. ........................ 280/707; 364/424.05
[58] Field of Search ............... 280/707, DIG. 1, 840, 280/6.12, 702, 703; 364/424.05

[56] References Cited

U.S. PATENT DOCUMENTS

| | | | |
|---|---|---|---|
| 3,124,368 | 3/1964 | Corley et al. | 280/DIG. 1 |
| 4,625,993 | 12/1986 | Williams | 280/707 |
| 4,872,701 | 10/1989 | Akatsu et al. | 280/707 |

FOREIGN PATENT DOCUMENTS

| | | | |
|---|---|---|---|
| 59-190016 | 10/1984 | Japan | 280/840 |
| 62-139709 | 6/1987 | Japan | 280/707 |
| 63-46909 | 2/1988 | Japan | 280/707 |

Primary Examiner—Charles A. Marmor
Assistant Examiner—Karin Tyson
Attorney, Agent, or Firm—Beveridge, DeGrandi & Weilacher

[57] ABSTRACT

An apparatus for controlling an active suspension system for an automotive vehicle comprises hydraulic suspensions, control valves for independently controlling each of the suspensions and a controller for issuing a signal for controlling of opening/closing of the respective control valves. The apparatus includes a longitudinal g sensor for detecting a longitudinal acceleration of a vehicle body and a lateral g sensor for detecting a lateral acceleration of the vehicle. To calculate a control quantity relative to feeding of hydraulic fluid in and discharging of the hydraulic fluid from the respective suspensions required for suppressing pitching and rolling of the vehicle body, the apparatus further includes a control logic which in the controller. A control quantity derived from the circuits is added to another control quantity derived from a vertical g acceleration sensor and a vertical relative displacement sensor, and the resultant control quantity is delivered to the control valve for each suspension.

7 Claims, 2 Drawing Sheets

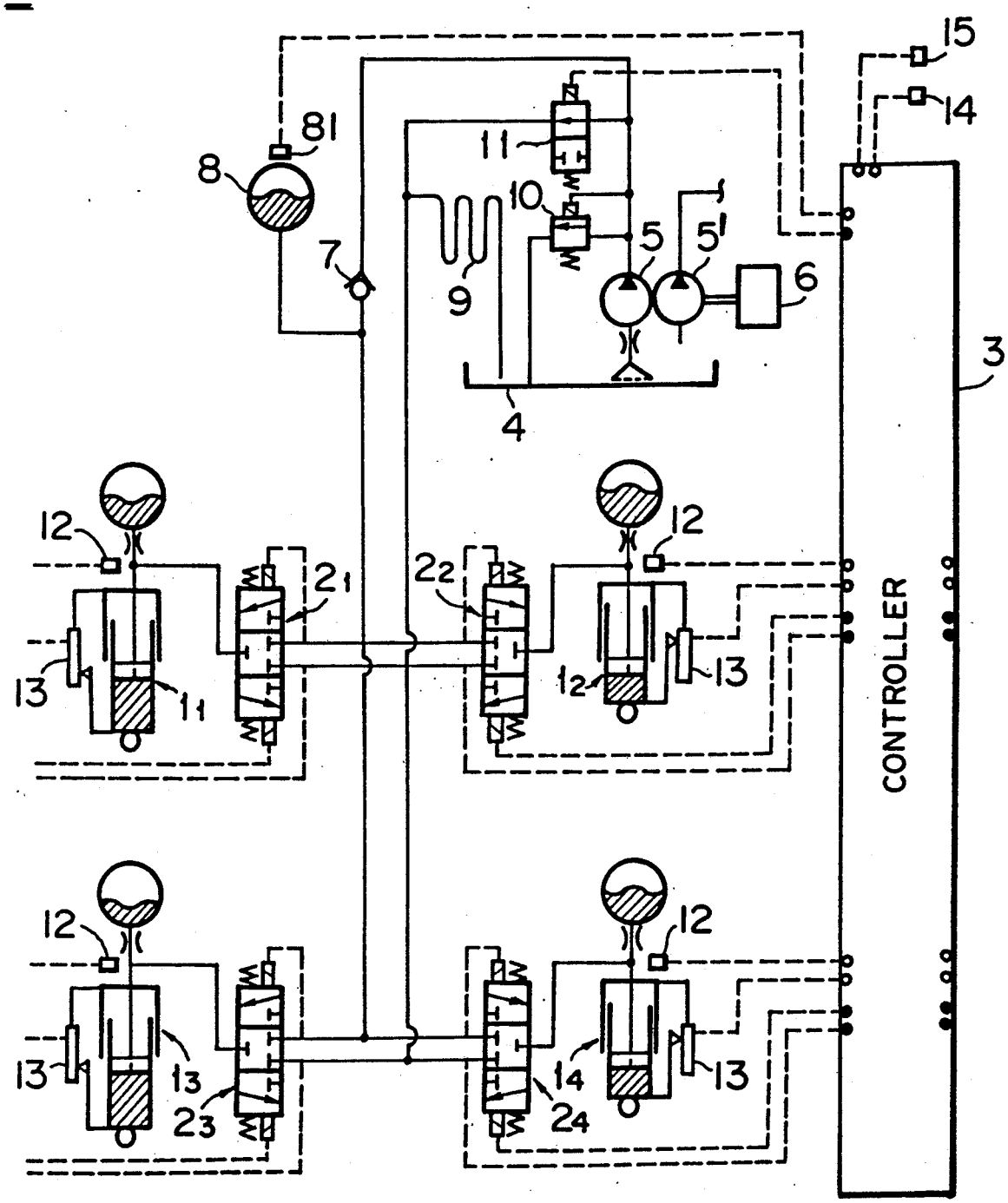
F I G. 1

CONTROLLING APPARATUS FOR ACTIVE SUSPENSION SYSTEM FOR AUTOMOTIVE VEHICLE

BACKGROUND OF THE INVENTION

1. Field of the Invention

The present invention relates generally to a controlling apparatus for an active suspension system for an automotive vehicle and more particularly to an apparatus for controlling the active suspension system, wherein a control logic is incorporated in a controller for the suspension system.

2. Description of the Related Art

A conventional active suspension system for an automotive vehicle using pneumatic springs of the type including a vertical acceleration sensor for detecting a vertical acceleration above the springs for each of front-/left, front/right, rear/left and rear/right air suspensions, respectively, a suspension stroke sensor for detecting a vertical relative displacement quantity above and below the spring for each air suspension, a controller for obtaining by calculating an instruction air flow quantity to be fed to each air suspension and to be discharged from each air suspension based on the vertical acceleration above the spring detected by the vertical acceleration sensor, the vertical relative displacement quantity detected by the suspension stroke sensor and a vertical relative displacement speed obtained from the vertical relative displacement quantity by calculation and a flow rate control valve for performing air feeding or air discharging in accordance with the instruction flow quantities independently per each air suspension whereby controlling is accomplished independently per each air suspension so as to vary an apparent mass of the vehicle body, a damper effect and a spring effect has been developed by a common applicant to the applicant of the present patent application and it was already laid open under Japanese Laid-Open Patent No. 139,709/1987.

Since the conventional active suspension is controlled by feeding and/or discharging air in the air suspension according to a vertical acceleration of the mass above the spring, and a relative displacement and a relative displacement speed between the masses above and below the spring, it is very effective to satisfy a soft feeling performance when receiving a sudden upward impulse from roads. And it is also very effective to keep the vehicle in proper attitude when receiving a slow moving force from roads.

However, the conventional active suspension system has a problem that when a large magnitude of longitudinal acceleration induced by quick braking, or a large magnitude of transverse acceleration induced by quick turning movement is exerted on the vehicle body, a certain delay for controlling to feed or discharge air tends to occur in response to quick movement of the load due to the aforementioned accelerations.

The present invention has been made with the foregoing problem in mind.

SUMMARY OF THE INVENTION

An object of the present invention is to provide an apparatus for controlling an active suspension system wherein the foregoing problem is solved satisfactorily.

The present invention provides an apparatus for controlling an active suspension system for an automotive vehicle of the type including a plurality of suspensions for supporting a vehicle body by pressure of working fluid, a plurality of control valves each serving to control feeding the fluid in and discharging of the fluid from each suspension independently per each suspension and a controller for detecting a vertical acceleration and a vertical relative displacement above and below the spring independently by means of sensors per each suspension and calculate a control quantity for the fluid to be fed in and discharged from each suspension based on informations on the vertical acceleration and the vertical relative displacement detected in that way per each suspension so as to produce a signal for controlling opening/closing of each of the control valves, wherein the apparatus comprises a longitudinal sensor for detecting a longitudinal acceleration of the vehicle body, a lateral g sensor for detecting a transverse acceleration of the vehicle body and a control logic for controlling opening/closing of the respective control valves by calculating a control quantity relative to feeding the fluid in and discharging of the fluid from each suspension independently per each suspension based on informations on the longitudinal acceleration detected by the longitudinal g sensor and the transverse acceleration detected by the transverse g sensor, the control quantity being required to suppress pitching and rolling of the vehicle body, the control logic being incorporated in the controller.

According to the present invention, control quantities derived from the longitudinal g acceleration sensor and the lateral g acceleration sensor are added to another control quantity derived from a vertical g acceleration sensor and a vertical relative displacement sensor, and a resultant control quantity is delivered to the control valve for each suspension via a control quantity correcting circuit and a valve driving signal generating circuit in the control logic.

Further, according to the present invention, the controlling apparatus is advantageously employable for the active suspension system for an automotive vehicle wherein the controller performs controlling relative to feeding/discharging the fluid such as hydraulic oil or gaseous medium based on the vertical acceleration and the vertical relative displacement above and below the spring independently per each suspension so as to provide a soft riding comfort in response to vibration inputted from the road surface and a hard riding comfort in response to force above the spring.

With the controlling apparatus as constructed in the above-described manner, delay of a controlling operation for properly maintaining a vehicle body attitude at a time of quick acceleration or during turning movement of the vehicle body can be reduced remarkably and moreover control with respect to vehicle body attitude can be realized at a higher accuracy.

A preferred embodiment of the present invention will become understood from the following detailed description referring to the accompanying drawings.

BRIEF DESCRIPTION OF THE DRAWINGS

The present invention is illustrated in the following drawings in which;

FIG. 1 is a schematic view of an apparatus for controlling an active suspension system for an automotive vehicle in accordance with an embodiment of the present invention.

DESCRIPTION OF THE PREFERRED EMBODIMENT

Figure 2:
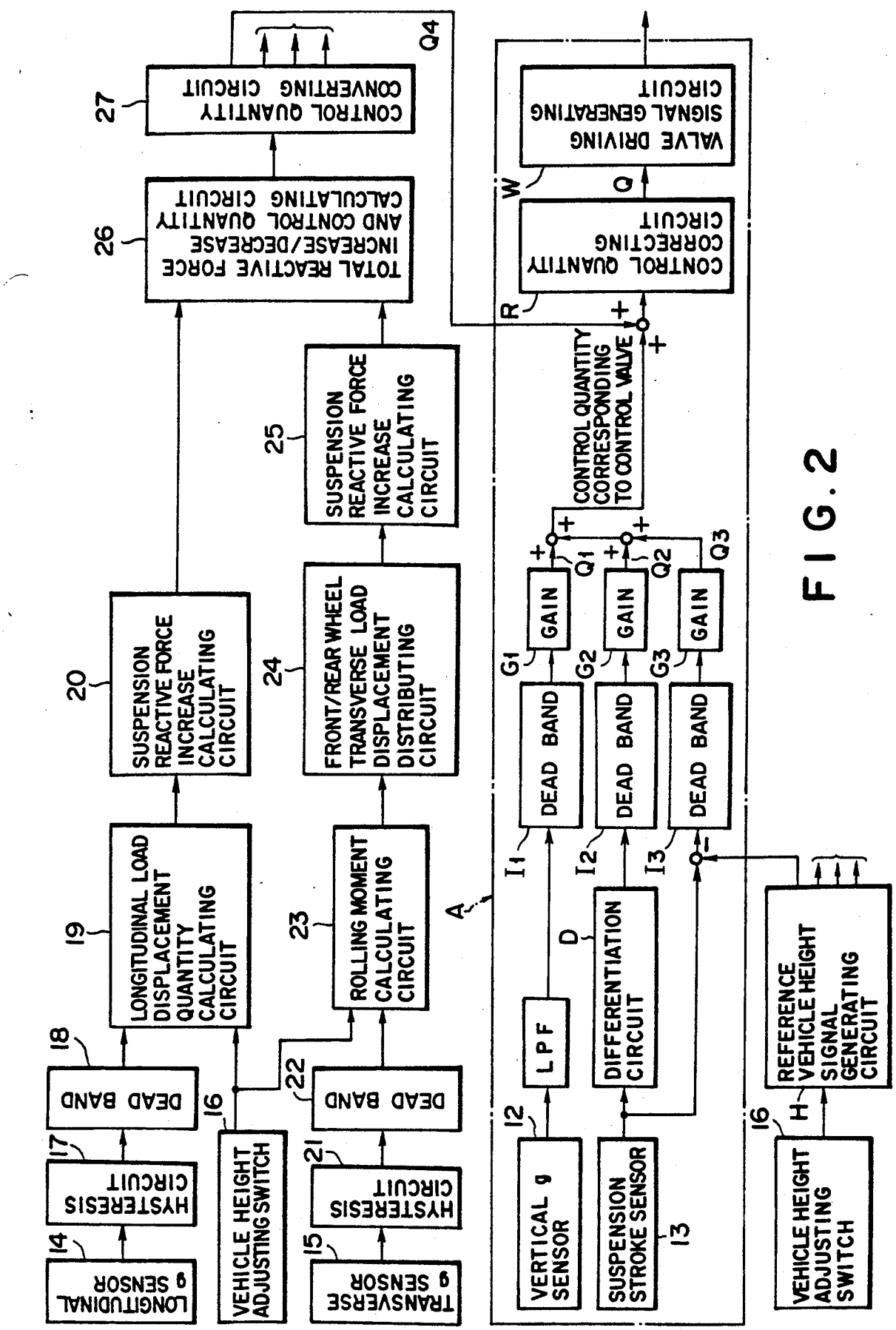
FIG. 2 is a block diagram illustrating a control logic for the controlling apparatus incorporated in a controller for the suspension system.

Now, the present invention will be described in detail hereinafter with reference to the accompanying drawings which illustrate a preferred embodiment thereof.

FIG. 1 is a schematic view illustrating an apparatus for controlling a suspension system for an automotive vehicle in accordance with the embodiment of the present invention.

Referring to the drawing, reference numerals $1_1$ and $1_2$ designate suspensions for left/front and right/front wheels and reference numerals $1_3$ and $1_4$ do suspensions for left/rear and right/rear wheels. A conventional hydropneumatic suspension comprises a hydraulic cylinder and a pneumatic spring section wherein the pneumatic spring section includes a hydraulic chamber and a closed pneumatic chamber both of which are separated from each other via a diaphragm. The hydraulic chamber of the pneumatic spring section is communicated with a hydraulic chamber of the hydraulic cylinder via an orifice and one end of the hydraulic cylinder (e.g., a bottom of the hydraulic cylinder) is operatively connected to a wheel suspension arm, while the other end of the hydraulic cylinder (e.g., a piston rod) is operatively connected to a vehicle body member for the respective suspensions.

Reference numerals $2_1$, $2_2$, $2_3$ and $2_4$ designate control valves, respectively. Hydraulic oil in the hydraulic cylinder of each suspension is charged and discharged by the valves $2_1$ to $2_4$. The respective control valves $2_1$, $2_2$, $2_3$ and $2_4$ are independently controlled in response to a valve driving signal from a controller 3.

Reference numeral 4 designates an oil reservoir and reference numeral 5 designates a hydraulic pump. The hydraulic pump 5 is driven by an engine 6. In the shown embodiment, the hydraulic pump 5 and another hydraulic pump 5' for the purpose of power steering are operatively connected to each other in tandem arrangement so that they are simultaneously driven by the engine 6. High pressure hydraulic oil discharged from the hydraulic pump 5 is accumulated in an accumulator 8 via a check valve 7. When one or more control valves ar shifted to feed oil, the high pressure hydraulic oil is fed into the hydraulic chambers of one or more hydraulic cylinders corresponding to the shifted control valves. When one or more control valves ar shifted to discharge oil, hydraulic oil is drained in the oil reservoir 4 from the hydraulic chambers of one or more hydraulic cylinders corresponding to the shifted control valves via an oil cooler 9.

Reference numeral 10 designates a relief valve and reference numeral 11 designates a loading/unloading valve. When the loading/unloading valve 11 is shifted to the shown unloaded state in response to a signal from the controller 3 with a signal from a pressure sensor 81. hydraulic oil discharged from the hydraulic pump 5 is returned to the oil reservoir 4 via the oil cooler 9. The pressure sensor 81 is intended to detect that the accumulator 8 is filled with hydraulic oil having a preset pressure.

Each of the suspensions $1_1$, $1_2$, $1_3$ and $1_4$ is equipped with a vertical acceleration sensor 12 for detecting a vertical acceleration above the spring and a suspension stroke sensor 13 for detecting displacement above the spring relative to displacement below the spring so that information, on the vertical acceleration above the spring as well as the vertical relative displacement are inputted into, the controller 3 per each suspension.

Reference numeral 14 designates a longitudinal g sensor for detecting a longitudinal acceleration of a vehicle body and reference numeral 15 does a lateral g sensor for detecting a lateral acceleration of the vehicle body. Information on the longitudinal acceleration detected by the longitudinal g sensor 14 as well as the lateral acceleration detected by the lateral g sensor 15 are also inputted into the controller 3.

Next, a control logic in the controller 3 will be described below with reference to FIG. 2.

A section A surrounded by one-doted chain lines in FIG. 2 represents a control block diagram for one of left/front, right/front, left/rear and right/rear suspensions, e.g., the suspension $1_1$ for a left/front wheel. Although the suspension system is provided with four control logics having the same structure as that of the control logic. One of them is shown in the drawing for the purpose of simplification of illustration, they are controlled independently per each suspension.

When each suspension detects a vertical acceleration and a vertical relative displacement by the sensors 12 and 13, the sensors 12 and 13 output a vertical acceleration signal and a vertical relative displacement signal.

The control logic permits the longitudinal acceleration signal to pass through a low-pass filter LPF thereby to cut off a high frequency component of the signal. Then, the signal passes further through a dead band circuit $I_1$ to remove or separate a signal having a preset range in the vicinity of zero, whereby an instruction control quantity $Q_1$ matching with characteristics of the relevant control valve is obtained by multiplying the resulting signal by a gain $G_1$.

On the other hand, the vertical relative displacement signal is divided into two parts, one part being to pass through a differentiation circuit D and the other one being to pass without any change. The signal which has passed through the differentiation circuit D becomes a vertical relative displacement velocity signal. The resulting signal passes further through a dead band circuit $I_2$ to cut off or remove a signal having a preset range in the vicinity of zero, whereby an instruction control quantity $Q_2$ matching with characteristics of the relevant control valve is obtained by multiplying the resulting signal by a gain $G_2$. On the other hand, the signal which has passed without any change becomes a true relative displacement signal by subtracting a difference from a reference vehicle height signal. The reference signal is derived from a vehicle height regulating switch 16 via a reference vehicle height signal generating circuit H. Then, the resulting signal passes through a dead band circuit $I_3$ to cut off or remove a signal having a preset range in the vicinity of zero, whereby an instruction control quantity $Q_3$ matching with characteristics of the relevant control valve is obtained by multiplying the resulting signal by a gain $G_3$.

The aforementioned three instruction control quantities $Q_1$, $Q_2$ and $Q_3$ each matching with characteristics of the relevant value represent an instruction valve opening time to feed in or to discharge oil from the control valve, while taking into account valve opening/closing characteristics.

The instruction control quantities $Q_1$, $Q_2$ and $Q_3$ are added to each other and then pass through a quantity circuit R for correcting an instruction correcting quantity so that the resulting quantity is converted into an instruction corrected quantity Q with various conditions such as temperature, pressure loss due to pipe length and others. Then, the instruction corrected quantity Q passes through a valve driving signal generating circuit W so that a control valve opening/closing signal is generated. Consequently, the control valve $2_1$ is shifted to feed or discharge the hydraulic oil in the suspension $1_1$ in accordance with the instruction control quantity.

During a period of the aforementioned control in the presence of the vertical acceleration, the hydraulic oil in the suspension $1_1$ is discharged therefrom in response to the upward acceleration, whereas the hydraulic oil is fed in the suspension $1_1$ in response to the downward acceleration. Consequently, when the suspension receives force from the below such as pushing-up force from the road surface, soft and high-damping suspension characteristics are exhibited. And when the suspension receives the force from the above (i.e., force exerted from the vehicle body), apparently hard suspension characteristics are exhibited to maintain the current vehicle height in presence of a vertical relative displacement speed as well as a relative displacement by feeing or discharging hydraulic oil in the direction of maintaining the vehicle height at a specific reference vehicle height. Further, since the vertical acceleration signal passes through the low pass filter LPF, the suspension hardly reacts in response to vibration in a high frequency region such as resonance below the spring, but the control is carried out mainly for vibration having a low frequency region in the vicinity of resonance above the spring. As a result, the vehicle has low fuel consumption, good riding comfort and excellent bouncing property.

Incidentally, the vehicle height regulating switch 16 is used for changing the height from a normal vehicle height to a high vehicle height. In the case where the normal vehicle height is selected, the reference vehicle height signal generating circuit H generates a low reference vehicle height signal, and thereafter when the vehicle height regulating switch 16 is shifted to a high vehicle height position, the reference vehicle height signal generating circuit H generates a high reference vehicle height signal. Since the control to be carried out is a control for the current vehicle height maintained at a certain reference vehicle height in response to the vertical relative displacement signal, the instruction control quantity $Q_3$ of the hydraulic oil is generated when the current reference vehicle height is shifted from the low normal reference vehicle height to the high reference vehicle height. Then, the suspension $1_1$ is fed with the hydraulic oil, whereby the vehicle height is raised up to a height equal to the high reference vehicle height. However, when the vehicle height regulating switch 16 is returned to the normal vehicle height side, the instruction control quantity $Q_3$ of the hydraulic oil is generated to discharge hydraulic oil in the suspension $1_1$, whereby the vehicle height is lowered to the normal reference vehicle height. It should be noted that feeding and discharging of the hydraulic oil in response to the vehicle height regulating switch 16 are simultaneously accomplished with respect to all the suspensions.

The control in dependency on the vertical acceleration above the spring and the control in dependency on the vertical relative displacement and on the vertical relative displacement speed above and the below the spring as described above assure that a comparatively small quantity of displacement of a load in the longitudinal direction as well as in the lateral direction caused by the normal longitudinal acceleration and transverse acceleration during a period of normal traveling of the vehicle can satisfactorily be adapted to properly maintain the vehicle attitude. However, in case where a large magnitude of longitudinal acceleration or lateral acceleration is quickly exerted on the vehicle at the time of, e.g., quick braking, quick accelerated movement, quick turning movement of the vehicle, it gives a problem that adaptation is liable to be achieved with delay merely by controlling in dependency on the vertical acceleration, the vertical relative displacement speed or the vertical displacement.

In view of the foregoing problem, according to the present invention, the controlling apparatus is additionally equipped with a longitudinal g sensor 14 for detecting a longitudinal acceleration of the vehicle body and a lateral g sensor 15 for detecting a lateral acceleration of the vehicle body so that controlling for properly maintaining the attitude of the vehicle body at the time of the quick accelerated/decelerated movement and the quick turning movement of the vehicle body is performed as mentioned below.

Specifically, as shown in FIG. 2, a longitudinal acceleration signal detected by the longitudinal g sensor 14 is converted into a signal by a hysteresis circuit 17 and a dead band circuit 18 such that it does not react in response to normal longitudinal g variation during a period of normal traveling of the vehicle but it becomes active when the vehicle body receives a large magnitude of pitching which is caused by a fully accelerated state, a braking operation higher than an intermediate intensity, and the resulting signal is inputted into a longitudinal load displacement quantity calculating circuit 19. The longitudinal load displacement quantity calculating circuit 19 is such that a quantity of displacement of the load in the longitudinal direction is calculated based on the input signal, various dimensions previously stored in the controller and informations on the current height of a gravity center of the vehicle body above the ground derived from the vehicle height regulating switch 16. And results derived from the calculation are transmitted to a suspension reactive force increase calculating circuit 20. The suspension reactive force increase calculation circuit 20 calculates per each suspension a quantity of increase/decrease of suspension reactive force. Against driving force and braking force active on tires based on information on the quantity of displacement of the load in the longitudinal direction, a type of each suspension and a type of driving (i.e., a front wheel driving type, a rear wheel driving type or a four wheel driving type).

The reason that the driving force and the braking force are taken into account depending on the type of each suspension is as follows. In case where the suspension is a trailing arm type, reactive force is supported by pivotal bearings when the driving force is exerted on wheels. Moment is loaded on the trailing arm in the direction of contracting suspension springs (anti-lift geometry characteristics during a period of braking) and the resulting load appears in an addition mode on the front wheel side but appears in a subtraction mode on the rear wheel side in response to displacement of the load in the longitudinal direction due to inertia force and moreover the moment is loaded on the driving wheels in response to the suspension reactive force during a period of accelerated traveling of the vehicle in the direction of extending the suspension springs due to the driving reactive force but such load does not appear on the follower wheels.

Load to be added or subtracted in this manner differs in dependency of arrangement of the trailing arm or the pivotal shaft. With respect to a wishbone type suspension, it differs in dependency on an angle of inclination of pivotal shafts for upper and lower control arms. In addition, with respect to a Mac Pherson type suspension, it differs in dependency on a position of the suspension strut, a position of a rotational shaft of the lower arm or the like.

A quantity of increase/decrease of the suspension reactive force for each suspension in dependency on the quantity of the displacement of the load in the longitudinal direction due to braking or acceleration as described above can not be exactly calculated unless a type of suspension, a type of driving, braking force to be exerted on each wheel and driving force are taken into account.

Also a lateral acceleration signal detected by the lateral g sensor 15 passes through a hysteresis circuit 21 and a dead band circuit 22 in the same manner as in the case of the longitudinal g sensor 14. Generally, however, the sensor 15 does not react in response to slight variation of the lateral g. But only the lateral acceleration signal in excess of a predetermined value is inputted into a rolling moment calculating circuit 23. The rolling moment calculating circuit 23 calculates a rolling moment in response to the signal depending on informations on various dimensions of the vehicle previously stored in the controller and a height of the gravity center above the ground derived from the vehicle height regulating switch 16 at this time. And the circuit 23 divides the rolling moment into a front wheel moment and a rear wheel moment in accordance with a target distribution ratio of the lateral load displacement quantity in the longitudinal direction. Then, the displacement quantity of the load in the lateral direction is calculated in a front/rear wheel lateral load displacement quantity calculating circuit 24 separately for the front and rear wheels and the resulting quantities are transmitted to a suspension reactive force increase calculating circuit 25. The suspension reactive force increase calculating circuit 25 is such that the total lateral force to be exerted on tires in correspondence to the generated g is basically divided in the longitudinal direction to provide an equilibrium in accordance with a yaw moment equilibrium equation with reference to a position of the gravity center of the vehicle body and a distance between the front and rear wheels and then calculates a suspension vertical reactive force increase/decrease quantity separately for the front and rear wheels while taking into account the lateral load displacement quantity, the tire lateral force, the vehicle height or the suspension type.

A suspension vertical reactive force increase/decrease quantity due to the longitudinal g calculated in the suspension reactive force increase calculating circuit 20 and a suspension vertical reactive force increase/decrease quantity due to the transverse g calculated in the suspension reactive force increase calculating circuit 25 are fed into a total suspension reactive force calculating circuit 26 in which the increase/decrease quantities are added to the respective suspensions to obtain a total quantity per each suspension and then calculate per each suspension a control quantity relative to feeding and discharging of the hydraulic oil required to maintain a suspension inner pressure (representing an inner pressure in the pneumatic chamber of the suspension) in correspondence to the total quantity. The control quantity is converted into an instruction control quantity $Q_4$ per each suspension in a control quantity converting circuit 27 in accordance with the value type (wherein this means that e.g., in case where the control valve is a flow rate control valve, an instruction valve opening time to feed side or to discharge is substituted for the instruction control quantity $Q_4$). Then, the instruction control quantity $Q_4$ is added to the instruction control quantities $Q_1$, $Q_2$ and $Q_3$ derived for per each suspension depending o the vertical acceleration above the spring, the vertical relative displacement speed above and below the spring and the vertical relative displacement quantity above and below the spring so that the resulting addition value comprising $Q_1$, $Q_2$, $Q_3$ and $Q_4$ passes through the control quantity correcting circuit R to obtain an instruction corrected quantity Q. Then, the valve driving signal generating circuit W generates a control valve opening/closing signal in response to the instruction corrected quantity Q so as to control feeding or discharging the hydraulic oil per each suspension.

When the longitudinal g or the lateral g is exerted on the vehicle body, the load is displaced in the longitudinal direction or in the lateral direction in dependency on the longitudinal g or the lateral g. As a result, the vehicle body attitude is varied in the form of nose diving or squatting in the direction of pitching or in the direction of rolling of the vehicle body. Therefore, when such variation of the vehicle body attitude is controlled to become the attitude, e.g., by receiving the signal from the suspension stroke sensor for detecting variation of suspension stroke, i.e., a resultant phenomenon attributable to the longitudinal g or the lateral g generated in that way, the control is unavoidably performed with some delay. Particularly, in case where a comparatively large magnitude of longitudinal g or lateral g is exerted on the vehicle body within a very short period of time, the result is that the control fails to be performed in good time. This may give a problem that the vehicle characteristics are unavoidably changed such that the vehicle attitude is once varied and then a normal attitude is restored.

According to the present invention, the controlling apparatus is added with a logic wherein the longitudinal g or the lateral g that is a factor causing variation of the vehicle body attitude is detected, a load displacement quantity of the vehicle body is obtained based on the detected longitudinal g or lateral g, a suspension reactive force increase/decrease quantity expected to occur with each suspension is calculated per each suspension while taking into account the type of suspension, the type of driving, the braking force active on tires, the driving force, the lateral force and others, and feeding or discharging of the hydraulic oil is controlled independently per each suspension depending on the results derived from the foregoing calculation. Consequently, control delay can be reduced remarkably and moreover a precise vehicle body attitude control can be realized.

As will be apparent from the above description, even when an error occurs with an expected instruction quantity relative to feeding of the hydraulic oil in or discharging of the hydraulic oil from each suspension in response to the longitudinal g or the lateral g of the vehicle body, the error can be eliminated by addition of a function which is independently effective for each wheel so as to allow the vehicle body attitude to be restored to an original one, whereby an attitude control can be realized with a higher accuracy.

The embodiment shown in FIG. 1 has been described above as to an example of the active suspension system to which the present invention is applied, wherein a plurality of hydropneumatic suspensions are employed for the suspension system. However, the present invention should not be limited only this. Alternatively, it may be applicable to an active suspension system which prevents vibration of the vehicle body and improves riding comfort and reliable control for the vehicle body attitude, wherein air or other gaseous medium is used as spring means (with arrangement of auxiliary dampers each having properties of providing low damping force) and air or other gaseous medium is feed in or discharged from the dampers.

As described above, according to the present invention, since the vertical acceleration above the spring, the vertical relative displacement quantity above and below the spring and the vertical relative displacement speed are detected per each suspension so that feeding of the fluid such as liquid or gas in and discharging of the fluid from each suspension are controlled independently per each suspension, suspension characteristics providing soft and excellent riding comfort without transmission of any force to the vehicle body by the members below the spring can be realized and moreover suspension characteristics providing reduced vertical displacement (reduced bouncing) of the vehicle body can be realized.

Further, since the controlling apparatus of the present invention has a logic in the controller for the purpose of controlling with the use of the vertical acceleration, the vertical relative displacement quantity and the vertical relative displacement speed as mentioned above, wherein the longitudinal acceleration and the lateral acceleration active on the vehicle body are detected thereby to calculate a load displacement quantity of the vehicle body so that feeding of the fluid in and discharging of the fluid from each suspension are controlled independently per each suspension, the vehicle body attitude controlling can be realized at a high accuracy with minimized time delay, while an occurrence of malfunction such as dive phenomenon, lift phenomenon or jack-up phenomenon is prevented satisfactorily.

In addition, since the controlling apparatus of the present invention is provided with the low-pass filters, the dead band circuits, the hysteresis circuits and other circuits for detecting informations, ineffective and useless control can be eliminated completely and quantity of consumed energy can be reduced remarkably.

While the presently preferred embodiment of the present invention has been shown and described, it is to be understood that this disclosure is merely for the purpose of illustration and that various changes and modifications may be made without departure from the scope of the invention as set forth in the appended claims.

What is claimed is:

1. An apparatus for controlling an active suspension system for an automotive vehicle including a plurality of suspensions for supporting a vehicle body by pressure of hydraulic fluid, a plurality of control valves to feed the hydraulic fluid in and to discharge the hydraulic fluid from each suspension independently, vertical acceleration sensing means for sensing a vertical acceleration of the vehicle body, vertical relative displacement sensing means for sensing a vertical relative displacement between masses above and below each suspension, and first control quantity calculating means responsive to the vertical acceleration and the vertical relative displacement for calculating a first control quantity for the hydraulic fluid to be fed in and discharged from each suspension, comprising:
a longitudinal acceleration sensor for sensing a longitudinal acceleration of the vehicle body;
a lateral acceleration sensor for sensing a lateral acceleration of the vehicle body;
longitudinal load displacement quantity calculating means responsive to said longitudinal acceleration and a predetermined vehicle height for calculating a longitudinal displacement quantity of the load of the vehicle body per each suspension;
first suspension reactive force increase calculating means responsive to said longitudinal displacement quantity for calculating a first increase value of a suspension reactive force for each suspension;
rolling moment calculating means responsive to said lateral acceleration and said predetermined vehicle height for calculating a rolling moment exerted on the vehicle body;
lateral displacement quantity calculating means responsive to said rolling moment for calculating a lateral displacement quantity of the load of the vehicle body per each suspension;
second suspension reactive force increase calculating means responsive to said lateral displacement quantity for calculating a second increase value of the suspension reactive force for each suspension;
second control quantity calculating means responsive to said first increase value and said second increase value for calculating a second control quantity for hydraulic fluid to be fed in and discharge from each suspension;
adding means for adding said first control quantity to said second control quantity to provide a total control quantity; and
controlling means responsive to said total control quantity for controlling corresponding control valve per each suspension, so as to decrease pitching and rolling of the vehicle body.

2. The apparatus according to claim 1, further comprising:
changing means for changing the predetermined vehicle height.

3. The apparatus according to claim 2, wherein said changing means is a vehicle height adjusting switch shiftable to one of plurality of vehicle height position.

4. The apparatus according to claim 1, wherein the first control quantity calculating means comprises:
differentiation means for differentiating the vehicle relative displacement to provide a first value;
means for calculating a difference between the vertical relative displacement and the predetermined vehicle height to provide a second value;
means for setting a third value in response to the magnitude of the vertical acceleration; and
summing means for summing the first, second and third values to provide the first control quantity.

5. A component of an apparatus for controlling an active suspension system for an automotive vehicle including a plurality of suspensions for supporting a vehicle body by pressure of hydraulic fluid, a plurality of control valves to feed the hydraulic fluid in and to discharge the hydraulic fluid from each suspension independently, comprising:
- a longitudinal acceleration sensor for sensing a longitudinal acceleration of the vehicle body;
- a lateral acceleration sensor for sensing a lateral acceleration of the vehicle;
- longitudinal load displacement quantity calculating means responsive to said longitudinal acceleration and a predetermined vehicle height for calculating a longitudinal displacement quantity of the load of the vehicle body per each suspension;
- first suspension reactive force increase calculating means responsive to said longitudinal displacement quantity for calculating a first increase value of a suspension reactive force for each suspension;
- rolling moment calculating means responsive to said lateral acceleration and said predetermined vehicle height for calculating a rolling moment exerted on the vehicle body;
- lateral displacement quantity calculating means responsive to said rolling moment for calculating a lateral displacement quantity of the load of the vehicle body per each suspension;
- second suspension reactive force increase calculating means responsive to said lateral displacement quantity for calculating a second increase value of the suspension reactive force for each suspension; and
- control quantity calculating means responsive to said first increase value and said second increase value for calculating a control quantity for the hydraulic fluid to be fed in and discharged from each suspension.

6. The component of claim 5, in combination with controlling means responsive to said control quantity for controlling corresponding control valve per each suspension, so as to decrease pitching and rolling of the vehicle body.

7. A component of an apparatus for controlling an active suspension system for an automotive vehicle including a plurality of suspensions for supporting a vehicle body by pressure of hydraulic fluid, a plurality of control valves to feed the hydraulic fluid in and to discharge the hydraulic fluid from each suspension independently, comprising:
- a lateral acceleration sensor for sensing a lateral acceleration of the vehicle;
- rolling moment calculating means responsive to said lateral acceleration and said predetermined vehicle height for calculating a rolling moment exerted on the vehicle body;
- lateral displacement quantity calculating means responsive to said rolling moment for calculating a lateral displacement quantity of the load of the vehicle body per each suspension;
- suspension reactive force increase calculating means responsive to said lateral displacement quantity for calculating an increase value of the suspension reactive force for each suspension; and
- control quantity calculating means responsive to said increase value for calculating a control quantity for the hydraulic fluid to be fed in and discharged from each suspension.

* * * * *